Patented Aug. 21, 1945

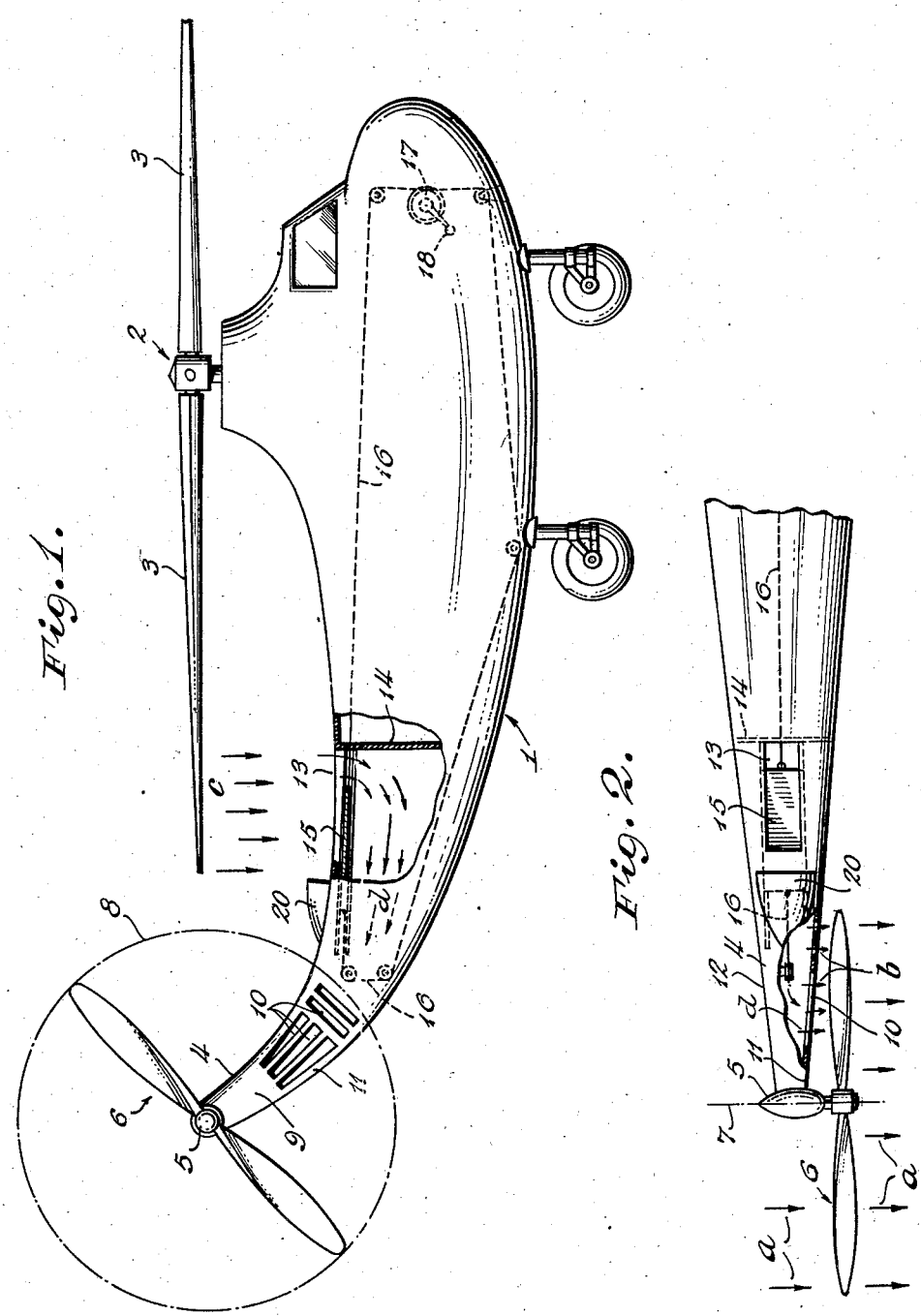

2,383,038

UNITED STATES PATENT OFFICE 2,383,038

AIRING OF ANTITORQUE PROPELLERS

Enea Bossi, New York, N. Y.

Application June 4, 1943, Serial No. 489,634

6 Claims. (Cl. 244—17)

The present invention relates to an aircraft with rotary wing system and more particularly to an aircraft of that type provided with an anti-torque propeller. In the conventional arrangement of an anti-torque propeller, the propeller shaft is mounted on the tail end of the fuselage with its axis in horizontal position at right angles to the longitudinal axis of the craft, the blades of the propeller rotating laterally of and close to the side wall of the fuselage tail. In consequence, there is an area of the propeller loading disc in which the blades overlap the fuselage structure. In general, a structure in front of a propeller causes less resistance to the air current than a similar structure in the rear owing to the difference in speed of the air accelerated by the rotating blades, "front" and "rear" being understood in this connection as seen in the direction of the air flow. For that reason the anti-torque propeller of an aircraft with rotary wing system is usually so arranged that it sucks the air from the side of the fuselage. However, owing to the short distance the propeller blades are spaced from the side wall of the fuselage the influence of the latter is very appreciable with the result that the individual blade does not operate uniformly throughout the entire propeller disc and that disturbing vibrations are set up.

The invention aims, therefore, to provide means whereby the generally occurring disturbances and vibrations can be at least greatly reduced. The invention consists essentially in the provision of openings in the side wall of the fuselage tail in order to admit air to the propeller through such openings even in that area of the propeller disc which overlaps the fuselage. The invention also provides means whereby air can be forced through the openings in order to insure, at least approximately, a uniform loading of the entire propeller disc. The invention further consists in the utilization of the drag of the rotary wing system of the craft for feeding air to the anti-torque propeller in said overlapping area.

Further objects and details of the invention will be apparent from the description given hereinafter and the accompanying drawing illustrating an embodiment thereof by way of example.

In the drawing,

Fig. 1 is a diagrammatical side elevation of rotary winged aircraft provided with the invention;

Fig. 2 is a top plan elevation of the rear portion thereof.

Referring now to the drawing, 1 is the fuselage of an aircraft whose rotary wing system comprises a rotor 2 with blades 3. The end of the tail 4 of the fuselage supports a bearing structure 5 of the anti-torque propeller 6 the axis 7 of which is horizontally located. The circle described by the tips of the propeller blades is indicated at 8. It overlaps the tail end 4 so that the air current $a$ towards the propeller is obstructed in the overlapping area 9 of the propeller disc.

Now, in order to provide for the admission of air into the area 9, ports or openings 10 are provided in the side wall 11 of the fuselage tail which faces the propeller. The ports may have any suitable configuration and size which will permit sufficient quantities of air to flow towards the propeller as indicated by arrows $b$. In order to furnish the air passing from the inside of the fuselage through the outlet ports or openings 10, other openings are provided which may be located at any suitable and convenient part of the fuselage. If this is done, the suction effect of the anti-torque propeller will tend to set up a constant current to the overlapping area 9. Thus, inlet ports may be arranged in the side wall 11, i. e. opposite the wall provided with the ports 10. It is even conceivable to leave the conventional fuselage frame-work uncovered as far as the blades of the anti-torque propeller overlap the tail 4. However, no design has been found fully satisfactory wherein the air passes through the tail in a direction parallel to the propeller axis as the unavoidable frame structure of the tail will still cause an appreciable resistance to the air current to the propeller. In this connection it is also to be taken into consideration that the relative wind caused by the craft in forward motion is harmful rather than helpful to the creation of a current transverse to the longitudinal axis of the craft. For this reason, it is advisable to provide an air inlet at a fuselage point forward of the tail end 4 so that air may flow through a portion or the whole of the fuselage tail. In many instances, it will be possible to select the location of the air inlet so that there prevails a zone of compression to provide for an appreciable pressure drop between the air inlet and outlet. In addition thereto, means may be provided in order to cause what may be called a forced draught within the fuselage towards the outlet ports 10. Such means may be in the manner of scoops or fans or blowers provided expressly for the mentioned purpose, or the air incidentally compressed for other purposes may be made available so as to impinge on the anti-torque propeller within the area 9. This is shown in Fig. 1 where an inlet port 13 is provided in the top surface of the fuselage underneath the circle covered by the blades 3 of the rotary wing system 2. When these blades rotate they will cause a downward drag (arrows c) whereby air will be pressed into the interior of the fuselage so as to flow in the direction of arrows d towards the tail end with ports 10. A scoop 20 may also be provided to assist in forcing the air into the inlet port 13. In order to prevent this air from spreading forward in the fuselage, a partition 14 may be provided in the latter in front of the opening 13. Now it will be clear that if the aircraft is in operation, that means when both rotor 2 and anti-torque propeller 6 are rotating, a current will be set up whereby air will be forced by blades 3 in the direction of the arrows c, d and b to the propeller 6 and, in particular to that area 9 of the propeller circle 8 which otherwise would receive only insufficient quantities of air owing to the screening effect of the tail of the fuselage. In this manner it is insured that sufficient air will be admitted throughout the entire propeller disc. Provided the sizes of the ports 10 are suitably selected, and the ports are properly arranged, uniform operation of the propeller can at least be approximately obtained. If once the openings are suitably selected no additional means for adjusting the quantity of air admitted to the anti-torque propeller may be necessary in the illustrated embodiment owing to the self-adjusting properties of the device. Such self-adjustment takes place owing to the fact that the higher the torque caused by the revolving rotor blades, the greater will be the quantity of air forced downward into the opening 13, and the greater will also be the quantity of air taken up by the anti-torque propeller in order to balance the torque of the rotor. However, if so desired additional means may be provided whereby the cross-section of the passage for the air current can be adjusted, either at one or both of the ports or at an intermediate point. This may be done, for instance as shown, by means of a slideable cover 15 which may be pulled forward or backward either automatically or under the control of the pilot by cables 16 in order to increase or decrease the size of the opening 13. In the illustrated embodiment, cables 16 are connected to a drum- or reel-like device 17 operative by the pilot turning a crank or lever 18 in the one or other direction to open or close the port 13 as far as desired. Thus, the device according to the invention renders it possible to admit air to that area of the anti-torque propeller disc which is overlapped by the fuselage tail, and the quantity of air admitted to the propeller 6 through the ports 10 can be so adjusted that the unit load in the area 9 is approximately equal to that in the remainder of the propeller disc, whereby disturbances and vibrations will be avoided or at least greatly reduced.

It will be apparent to those skilled in the art that many modifications and alterations of the system described and illustrated by way of example may be made, without departing from the essence and spirit of my invention which is not limited by the particular disclosure of the embodiment thereof but by the scope of the appended claims.

I claim:

1. In an aircraft including a fulselage and a rotary wing system, the combination of an anti-torque propeller rotatable about a horizontal axis in a vertical plane outside of and close to one of the side walls of the tail end of the fuselage, a portion of the disc of said propeller and a portion of said side wall being in overlapping relationship to each other, and an air outlet in said overlapped portion of said side wall.

2. In an aircraft including a fuselage and a rotary wing system, the combination of an anti-torque propeller rotatable about a horizontal axis in a vertical plane outside of and close to one of the side walls of the tail end of the fuselage, a portion of the disc of said propeller and a portion of said side wall being in overlapping relationship to each other, an air outlet in said overlapped portion of said side wall, an air inlet in a portion of the fuselage forward of said outlet, and an air passage between the inlet and the outlet.

3. In an aircraft including a fuselage and a rotary wing system, the combination of an anti-torque propeller rotatable about a horizontal axis in a vertical plane outside of and close to one of the side walls of the tail end of the fuselage, a portion of the disc of said propeller and a portion of said side wall being in overlapping relationship to each other, an air outlet in said overlapped portion of said side wall, and means to create a forced air draught in a portion of said fuselage towards said outlet.

4. In an aircraft including a fuselage and a rotary wing system, the combination of an anti-torque propeller rotatable about a horizontal axis in a vertical plane outside of and close to one of the side walls of the tail end of the fuselage, a portion of the disc of said propeller and a portion of said side wall being in overlapping relationship to each other, an air outlet in said overlapped portion of said side wall, an air inlet in a portion of the fuselage forward of said outlet, an air passage between the inlet and the outlet, and means to adjust the current of air passing through said outlet.

5. In an aircraft including a fuselage in a rotary wing system, the combination of an anti-torque propeller rotatable about a horizontal axis in a vertical plane outside of and close to one of the side walls of the tail end of the fuselage, a portion of the disc of said propeller and a portion of said side wall being in overlapping relationship to each other, an air outlet in said overlapped portion of said side wall, and an inlet in the top surface of the fuselage underneath and within the range of the rotary wings of said system, and an air passage from said inlet to said outlet.

6. In an aircraft including a fuselage in a rotary wing system, the combination of an anti-torque propeller rotatable about a horizontal axis in a vertical plane outside of and close to one of the side walls of the tail end of the fuselage, a portion of the disc of said propeller and a portion of said side wall being in overlapping relationship to each other, an air outlet port in said overlapped portion of said side wall, an inlet port in the top surface of the fuselage underneath and within the range of the rotary wings of said system, an air passage from said inlet to said outlet port, and a movable cover to adjust the active size of at least one of said ports.

ENEA BOSSI.